US011064724B2

(12) United States Patent
Maupin (10) Patent No.: US 11,064,724 B2
(45) Date of Patent: Jul. 20, 2021

(54) ROTARY SCREW BLANCHER

(71) Applicant: Lyco Manufacturing Inc., Columbus, WI (US)

(72) Inventor: Daniel D. Maupin, Corvallis, OR (US)

(73) Assignee: Illinois Tool Works Inc., Glenview, IL (US)

( * ) Notice: Subject to any disclaimer, the term of this patent is extended or adjusted under 35 U.S.C. 154(b) by 292 days.

(21) Appl. No.: 16/146,119

(22) Filed: Sep. 28, 2018

(65) Prior Publication Data

US 2019/0029310 A1    Jan. 31, 2019

Related U.S. Application Data

(63) Continuation of application No. 13/613,259, filed on Sep. 13, 2012, now Pat. No. 10,085,477.

(60) Provisional application No. 61/538,435, filed on Sep. 23, 2011.

(51) Int. Cl.
| | | |
|---|---|---|
| A23N 12/04 | (2006.01) | |
| A23B 7/06 | (2006.01) | |
| B23K 9/23 | (2006.01) | |
| B23K 26/00 | (2014.01) | |
| B23K 26/34 | (2014.01) | |
| B23K 15/00 | (2006.01) | |
| B23K 9/04 | (2006.01) | |
| H05B 6/80 | (2006.01) | |

(52) U.S. Cl.
CPC ............... *A23N 12/04* (2013.01); *A23B 7/06* (2013.01)

(58) Field of Classification Search
None
See application file for complete search history.

(56) References Cited

U.S. PATENT DOCUMENTS

| 3,086,444 A | * | 4/1963 | De Back | A23B 7/06 |
| | | | | 99/483 |
| 3,144,818 A | | 8/1964 | Sullivan | |
| 3,616,747 A | * | 11/1971 | Lapeyre | A23N 12/00 |
| | | | | 99/405 |
| 3,722,401 A | * | 3/1973 | Davidson | A23N 12/00 |
| | | | | 99/407 |

(Continued)

FOREIGN PATENT DOCUMENTS

EP    0325807    8/1989

OTHER PUBLICATIONS

International Preliminary Report on Patentability, dated Mar. 25, 2014, The International Bureau of WIPO, Geneva, Switzerland.

(Continued)

*Primary Examiner* — Ibrahime A Abraham
*Assistant Examiner* — Gyounghyun Bae
(74) *Attorney, Agent, or Firm* — George R. Corrigan (57) ABSTRACT

A food processing apparatus including a tank having an inlet end for receiving food product and an outlet end for discharging food product, the tank having a rotatable auger mounted in a compartment, the auger for advancing food product within the compartment from the inlet end toward the outlet end, the auger including flights having a flight wall with a radial edge, a clearance space being defined between the radial edge of the flights and a solid, imperforate wall portion of an inner wall. One of the inner wall and the flight wall may include a perforated wall portion. A transition zone includes a moveable surface to contain food product while in use.

22 Claims, 6 Drawing Sheets

(56) References Cited

U.S. PATENT DOCUMENTS

| | | | | |
|---|---|---|---|---|
| 3,727,759 A | | 4/1973 | Stevens | |
| 3,760,714 A | * | 9/1973 | Lortz | A23N 12/04 99/404 |
| 3,815,491 A | | 6/1974 | Guyer | |
| 4,018,899 A | | 4/1977 | Seckler et al. | |
| 4,091,721 A | | 5/1978 | Cosmi | |
| 4,117,776 A | | 10/1978 | Hunt | |
| 4,237,782 A | | 12/1980 | Bichel | |
| 4,253,946 A | | 3/1981 | Ludwig | |
| 4,380,496 A | | 4/1983 | Maffet | |
| 4,688,476 A | * | 8/1987 | Zittel | A23B 7/06 220/827 |
| 5,085,137 A | | 2/1992 | Mottur et al. | |
| 5,133,249 A | * | 7/1992 | Zittel | A23B 7/06 134/132 |
| 5,137,740 A | | 8/1992 | Benson et al. | |
| 5,146,841 A | * | 9/1992 | Zittel | A23B 7/06 100/117 |
| 5,147,133 A | | 9/1992 | White | |
| 5,327,817 A | * | 7/1994 | Zittel | A23L 3/02 99/348 |
| 5,329,842 A | * | 7/1994 | Zittel | A23B 7/0053 134/132 |
| 5,341,729 A | * | 8/1994 | Zittel | A23B 7/06 134/132 |
| 5,363,747 A | | 11/1994 | Clark et al. | |
| 5,427,015 A | * | 6/1995 | Zittel | A23B 7/06 134/132 |
| 5,592,869 A | * | 1/1997 | Zittel | A23B 7/06 100/117 |
| 5,632,195 A | * | 5/1997 | Zittel | A23B 7/06 134/132 |
| 5,669,288 A | * | 9/1997 | Zittel | A23N 12/04 134/132 |
| 5,752,431 A | * | 5/1998 | Zittel | A23N 12/04 99/348 |
| 5,780,088 A | | 7/1998 | Zittel | |
| 5,802,961 A | * | 9/1998 | Hay | A23B 7/0053 165/111 |
| 5,852,882 A | * | 12/1998 | Kendall | F26B 11/181 34/599 |
| 5,972,413 A | * | 10/1999 | Whitney | A23L 7/196 426/618 |
| 6,095,035 A | * | 8/2000 | Zittel | A23B 7/158 134/132 |
| 6,105,485 A | | 8/2000 | Zittel | |
| 6,187,360 B1 | * | 2/2001 | Zittel | A23B 7/06 426/510 |
| 6,205,913 B1 | * | 3/2001 | Zittel | A23B 7/06 134/132 |
| 6,214,400 B1 | * | 4/2001 | Zittel | A23L 5/17 426/509 |
| 6,263,785 B1 | * | 7/2001 | Zittel | A23B 7/06 134/132 |
| 6,419,094 B1 | | 7/2002 | Zittel et al. | |
| 6,776,087 B1 | | 8/2004 | Amstad | |
| 7,500,426 B2 | * | 3/2009 | Zittel | A23L 3/185 134/132 |
| 7,735,415 B2 | | 6/2010 | Zittel et al. | |
| 8,006,613 B2 | * | 8/2011 | Stousland | A23N 12/04 99/361 |
| 8,191,466 B2 | * | 6/2012 | Maupin | A23N 12/06 99/348 |
| 9,060,530 B2 | * | 6/2015 | Stousland | A23L 3/001 |
| 10,065,136 B2 | * | 9/2018 | Maupin | B01D 33/11 |
| 10,085,477 B2 | * | 10/2018 | Maupin | A23N 12/04 |
| 10,744,542 B2 | * | 8/2020 | Bigney | B07B 4/08 |
| 2003/0230198 A1 | * | 12/2003 | Zittel | A23B 7/0053 99/348 |
| 2005/0260311 A1 | | 11/2005 | Garwood | |
| 2007/0044666 A1 | * | 3/2007 | Zittel | A47J 37/1214 99/348 |
| 2009/0022877 A1 | | 1/2009 | Sample | |
| 2010/0015311 A1 | * | 1/2010 | Stousland | A23L 5/10 426/509 |
| 2010/0043649 A1 | * | 2/2010 | Maupin | B01D 29/356 99/348 |
| 2010/0196565 A1 | | 8/2010 | Glascock et al. | |
| 2011/0072980 A1 | * | 3/2011 | Maupin | A23B 4/26 99/348 |

OTHER PUBLICATIONS

International Search Report and Written Opinion of the International Searching Authority, European Patent Office, dated Jan. 23, 2013, Rijswijk, Netherlands.

* cited by examiner

ROTARY SCREW BLANCHER

RELATED APPLICATIONS

This is a continuation of, and claims the benefit of the filing date of, U.S. patent application Ser. No. 13/613,259, filed on Sep. 13, 2012 which issued as U.S. patent Ser. No. 10/085,477 on Oct. 2, 2018 and is a continuation of, and claims the benefit of the filing date of, U.S. Provisional Patent Application No. 61/538,435, filed on Sep. 23, 2011.

FIELD OF THE INVENTION

The present invention relates to blanchers and, more particularly to rotary screw blanchers with a passage for fluid and/or with fluid agitation.

BACKGROUND OF THE INVENTION

In mass processing of food product, food product is often heated by cooking or blanching the food product in a food processing apparatus having a tank holding a heat transfer medium into which the food product is immersed. After cooking or blanching of the food product occurs, the food product may be cooled or chilled by immersing the food product in a cool transfer medium so that the food product may be packaged, stored and/or shipped. In some known systems, a rotary drum blancher or a rotary screw blancher is used to first cook or blanch the food product, and the food product is discharged onto a belt or other type of conveyor and advanced to a rotary cooler to reduce the food product temperature to an acceptable temperature. In another known system, a single compact apparatus (e.g., a combination cooker-cooler) is used to heat and cool the food product in continuous flow.

In a rotary drum blancher, food product is introduced into an inlet end of an elongate drum, which is rotatably mounted in a generally cylindrical, open-top tank. The tank is fitted with a cover for minimizing heat loss and for enclosing the drum for safety reasons, and which can be opened for maintenance and cleaning. The drum includes an auger therein for advancing food product from the inlet end of the drum to an outlet end of the drum and through the heat transfer medium. The drum includes a structural frame with perforated skin panels that are typically bolted on or can be partially or fully removable from the drum.

In a rotary screw blancher, food product is introduced into an inlet end of a generally cylindrical, open-top tank. A rotatable auger is mounted within the tank for advancing food product from the inlet end to an outlet end of the tank and through a heat transfer medium. The tank is fitted with a cover for minimizing heat loss and for enclosing the auger for safety reasons, and which can be opened for maintenance and cleaning.

The rotary blancher is generally used to cook a variety of food products, including pasta, rice, vegetables, dry beans, pouched meat, pouched sauces, etc. Cleanliness is a concern in the food processing industry, and strict hygienic standards and inspections are observed throughout the industry for machinery that comes in contact with food for human consumption. Many facilities will process small batches of a variety of products in a single day or shift, which requires cleaning of the rotary blancher, and in particular the drum, between product runs. It is necessary for rotary blanchers to provide access for cleaning sprays to all joints and cavities within the drum where contaminant accumulation may occur. In some rotary drum blanchers, it is necessary to remove perforated skin panels from the drum frame or reposition access doors of the drum to perform the necessary cleaning. Such actions require high levels of labor and machine down time.

One solution is use of a rotary screw blancher, which is easier to clean because the rotary screw blancher lacks a drum and has higher food product capacity than similarly sized rotary drum blanchers because food product can run at deeper depths. However, the auger causes more damage to food product as compared to rotary drum blanchers, especially if food product is caught in clearance gaps between the auger and the tank.

Some prior art rotary screw blanchers include an inner screen with a very small clearance between the auger and the screen to reduce damage to product. The screen also allows water flow from one auger flight to the tank surrounding the screen, and thus to another flight. One example of such a prior art rotary screw blancher may be found in U.S. Pat. No. 7,735,415, hereby incorporated by reference. The rotary blancher described therein includes the ability to move the screen from a first position for using the blancher, to a second position for cleaning the blancher.

Another rotary screw blancher is described in US Patent Application Publication 20110072980, hereby incorporated by reference, and includes an auger with close clearance to a solid imperforate tank. A screen panel with side channels is provided to allow water flow between the auger flights. The screen panels are moveable (or removable) to allow cleaning behind the screens.

Prior art rotary screw blanchers have included several discharge mechanisms, including a ferris wheel style (shown in U.S. Pat. No. 7,735,415) and a plenum style (shown in application publication 20110072980 and in U.S. Pat. No. 8,006,613, hereby incorporated by reference).

One need of the prior art is the ability to transition from the auger portion of the blancher to the discharge portion, and to provide easy cleaning of the transition zone. If this distance is short, there is less likelihood of product falling outside the area intended to contain the product, but this puts several large plates of sheet metal close together, and this is difficult to clean. If the transition is extended, then cleaning of the large plates becomes easier, but there is a hidden surface on the underneath side of this transition that requires access doors to visually inspect, or mirrors or other devices are required. Cleaning of this area has been a concern for food processing companies that process Ready to Eat meals (RTE's) or companies with high sanitation requirements. A close transition is desirable to allow the product to move from the main tank to the discharge section of the tank.

SUMMARY OF THE PRESENT INVENTION

According to a first aspect of the invention a food processing apparatus is a rotary screw blancher with a tank having an inlet end for receiving food product and an outlet end for discharging food product. The tank has a rotatable auger mounted in a compartment that advances food product from the inlet end toward the outlet end. The auger includes flights having a flight wall with a radial edge. A clearance space is between the radial edge of the flights and the compartment wall. One of the inner wall and the flight wall may include a perforated wall portion to allow for fluid flow between flights. A transition zone between the auger and the outlet end includes a moveable surface to contain food product while in use.

The inner wall and/or flights are at least partially perforated whereby fluid can flow between flights in some alternatives.

The inner wall includes a portion that moves between an operating position for maintaining the food product in the compartment, and a cleaning position to allow access for cleaning the compartment in other alternatives.

The outlet end has a discharge chute and/or a plenum discharge and/or a ferris wheel to remove food product, and/or the inlet end has a chute and/or a flume to receive food product in other alternatives.

A source heated water provides heated water to the compartment in other alternatives.

A cooler, that may have a source of chilled water, receives food product from the transition in other alternatives.

A moveable cover is attached to the tank in other alternatives.

A manifold, within or outside of the tank, is disposed to provide water to the compartment, and/or does so using nozzles, in other alternatives.

The transition covers an arc of at least 180 or 240 degrees and/or extends from beneath the fluid level to above the fluid level in various alternatives.

The transition is comprised of two portions, that can be mirror images of one another, and a support bar can support each portion when the transition is in the operating position in various alternatives.

The transition forms a portion of a circumference of a circle, and when the transition is moved from the operating position to the cleaning position it follows a path that further defines the circumference of the circle in various alternatives.

A restraint engages the transition to hold it in the cleaning position in various alternatives.

A clamping mechanism, partially affixed to the transition, clamps the transition in place in various embodiments.

The cleaning position is in a fixed position, not a fixed position, in the tank, or outside of the tank in various embodiments.

Other principal features and advantages of the invention will become apparent to those skilled in the art upon review of the following drawings, the detailed description and the appended claims.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular blancher and discharge, it should be understood at the outset that the invention can be implemented with other blanchers, coolers, cookers and discharges.

This invention generally includes a screw conveyor within a tank that has water injection inside the tank area, and a movable screen wall within that tank that allows passage of water easily between the flights of the auger, and/or to the discharge area. This allows for easy water balance within the whole tank and does not cause irregular water levels within individual flights. In addition, there is a movable transition between the main tank and the ferris wheel tank area that allows cleaning access to all surfaces without hidden or shaded areas that would prevent visible inspection of all surfaces. The mechanism for moving the transition can be similar to the movable screens in the main tank area. As used herein, the tank can be the structure holding the water, and the tank can include a drum, can be without a drum, or a drum can be the tank.

Figure 1:
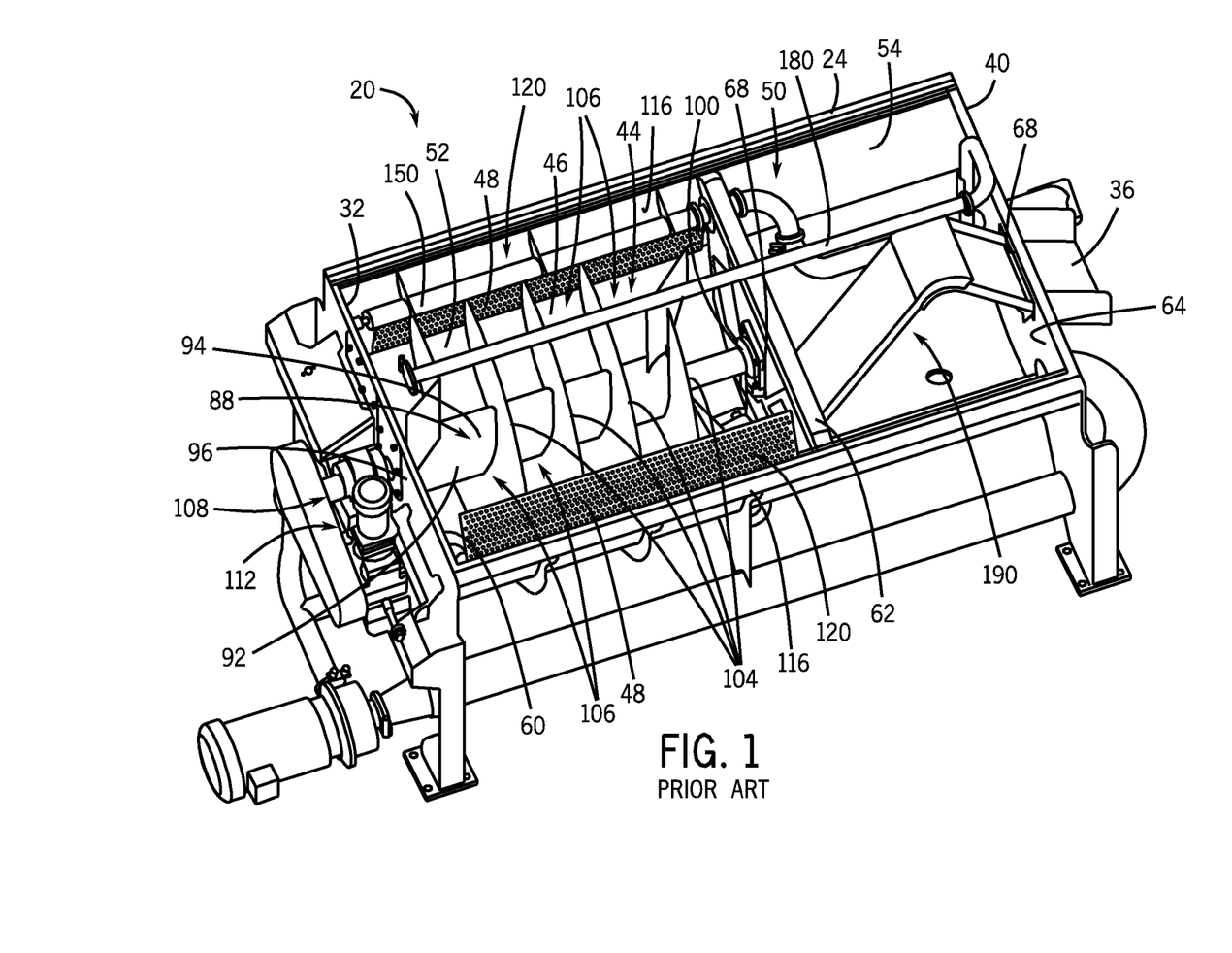
FIG. 1 is prior art blancher.

The invention will be described initially with respect to the rotary screw blancher described in US Patent App. Publ. 20110072980. The blancher includes a rotary auger with a number of flights. The tolerance between the auger flights and the compartment containing the auger is tight. FIG. 1 shows a prior art rotary screw blancher 20 for use in a food processing system. The blancher 20, or cooker, uses a heat transfer medium to cook food product that advances through the blancher 20. In other constructions, the blancher 20 may be used for other food processing operations, such as, for example, cooling food product. Features of the blancher 20 may be similar to the blancher shown and described in U.S. Pat. No. 7,735,415.

The tank 24 is supported by a frame having legs that rest upon a support surface and space the tank 24 above the support surface. The tank 24 is preferably made of stainless steel or another suitable material for food processing applications. The tank 24 defines, in part, an inner compartment 50 which, in the illustrated construction, is divided into a blanching compartment 52 and a dewatering compartment 54. In other constructions, the inner compartment 50 may include a single compartment or may be divided into more than two compartments Tank 24 includes an inlet end wall 60 at the inlet end 32 of the tank 24, an intermediate wall 62 and an outlet end wall 64 at the outlet end 40 of the tank 24. Each end wall 60, 64 defines an opening 68 (the opening in the outlet end wall 64 is shown in FIG. 1) that communicates with the inner compartment 50 of the tank 24. The infeed flume or chute passes through the opening 68 in the inlet end wall 60 and a discharge chute 36 (or a discharge chute) passes through the opening 68 in the outlet end wall 64.

The intermediate wall 62 divides the inner compartment 50 into the blanching compartment 52 and the dewatering compartment 54. The intermediate wall 62 also defines an opening 68 communicating between the blanching compartment 52 and the dewatering compartment 54. Other configurations of the walls, openings and chutes and/or flumes may be utilized in other constructions of the blancher 20. The preferred embodiment uses a ferris wheel-type discharge, with dewatering compartment 52 being smaller, and does not utilize intermediate wall 62.

A cover is generally attached to the tank 24 in such a manner as to allow the cover to move relative to the tank 24 and permit access to the inner compartment 50. In the one construction, lift cylinders (not shown) may extend between the tank 24 and the cover to lift the cover relative to the tank 24 and permit access to the tank 24 and the inner compartment 50. In another construction, the cover may be hingedly connected to the tank 24 so the cover can be swung away from the tank 24 to permit access to the tank 24 and the inner compartment 50.

An auger 88, or helical screw, is disposed within the blanching compartment 52 and rotates to advance food product from the inlet end 32 of the tank 24 toward the outlet end 40 of the tank 24. The auger 88 includes a shaft 92 that extends along an axis 94 between the inlet end wall 60 and the intermediate wall 62 of the tank 24. To support the auger 88, a first end 96 of the shaft 92 is rotatably supported by the inlet end wall 60, and a second end 100 of the shaft 92 is rotatably supported by the intermediate wall 62.

The auger 88 includes a plurality of axially spaced apart and interconnected flights 104 that spiral substantially the length of the blanching compartment 52. Generally, the flights 104 define auger sections 106 therebetween. As the auger 88 rotates, the flights 104 move food product from the inlet end 32 of the tank 24 to the intermediate wall 62 of the tank 24 and through the sections 106 of the auger 88. The blancher 20 includes a drive assembly interconnected with the auger shaft and a main drive motor which drives rotation of the auger 88. The tank 24 and the auger 88 are configured and adapted to maintain a tight tolerance between the two. For example, a clearance gap between the inner wall 44 and the radial edge of the auger flights 104 may be between about 0.03 inches and about 0.25 inches and, in some constructions, between about 0.05 inches and 0.15 inches. In the illustrated construction, the clearance gap is about 0.12 inches. The tight tolerance between the tank 24 and the auger 88 reduces damage to food product passing through the blanching compartment 52, because the small clearance gap prevents even small size food product, such as rice, beans, noodles, etc., from becoming stuck between the inner wall 44 and the auger 88. Generally, as long as the food product to be processed is larger than the clearance gap, damage to the food product passing through the blanching compartment 52 will be reduced. Further, the clearance gap is sufficient to prevent metal-to-metal contact between the tank 24 and the auger 88, as the auger 88 rotates, which could introduce contaminant metal particles into the food product.

As mentioned above, in the illustrated construction, the inner wall 44 has a solid, imperforate wall portion 46 and a perforated wall portion 48. The tank 24 also has an outwardly-extending second wall portion 116 generally connected to the solid, imperforate wall portion 46. The perforated wall portion 48 is positioned such that a passage 120 is defined between the perforated wall portion 48 and the second wall portion 116. The passage 120 extends in a direction of the inlet end 32 and the outlet end 40 and spans at least two auger sections 106. In the illustrated construction, the passage 120 extends from the inlet end 32 to the outlet end 40. In the illustrated construction, the tank 24 includes a passage 120 (and a second wall portion 116 and a perforated wall portion 48) on each lateral side. Generally, at least a portion of the perforated wall portion 48 and the passage 120 is below the fluid level. Flow of fluid is thus provided through the perforated wall portion 48 and into and along the passage 120 to generally balance the fluid level F in the blanching compartment 52 and between the auger sections 106. At the same time, the shield-like perforated wall portion 48 helps contain the food product in a given auger section 106 and prevent migration of the food product between auger sections 106.

A manifold 150 is positioned in the tank 24 above the axis 94 of the auger 88 and beyond the radial edge of the flights 104 of the auger 88. Alternatives provide that the manifold be outside the tank. The manifold 150 is positioned below the height of the auger 88. In the illustrated construction, the manifold 150 is the positioned closer to one opposite side (e.g., the left side when viewed from the inlet end 32) of the inner wall 44 and is configured to inject fluid (see arrow A in FIG. 2) downwardly along one opposite side of the inner wall 44 and into the blanching compartment 52. The injected fluid generally follows the curve of the inner wall 44 to induce a swirling flow in the blanching compartment 52. In other constructions (not shown), the manifold 150 may be positioned on the opposite side (e.g., the right side), or a manifold 150 may be positioned on each side of the tank 24. Alternatives provide for having the manifold below the axis, outside of the tank, not using a movable screen wall and/or not using water injection.

The manifold 150 includes a plurality of injectors or agitators 221, directed into the blanching compartment 52. Directed flows, jets or streams of fluid are discharged from injectors or nozzles 221 into the blanching compartment 52. Fluid is discharged from the injectors 172 with sufficient force to pass through the perforated wall portion 48 and displace the food product. The discharged fluid may displace food product in the blanching compartment 52, keep the food product off the inner wall 44 of the tank 24, breaks up clumps of food product, protect the food product from damage, reduce temperature variation in the food product, help increase heat transfer, etc. One example of suitable injectors is described in U.S. Pat. Nos. 6,214,400 and 6,234,066, the entire contents of which are hereby incorporated by reference. Another embodiment provides that the nozzles 221 are located to direct water along and down the interior of wall portion 48.

Uncooked food product is inserted into the blancher 20 through the inlet end 32 of the tank 24. The auger 88 is rotated to move the uncooked food product through the hot heat transfer medium in the blanching compartment 52. As the food product moves through the heat transfer medium, the food product becomes cooked.

In some construction, the blancher 20 could be used in a combination cooker-cooler. In such a construction, the blancher 20 can provide the cooker portion, and the transfer mechanism 190 can transfer the food product from the cooker portion to the cooler portion. Another transfer mechanism, which may be similar to the transfer mechanism 190, may be provided to transfer food product from the cooler portion.

Figure 2:
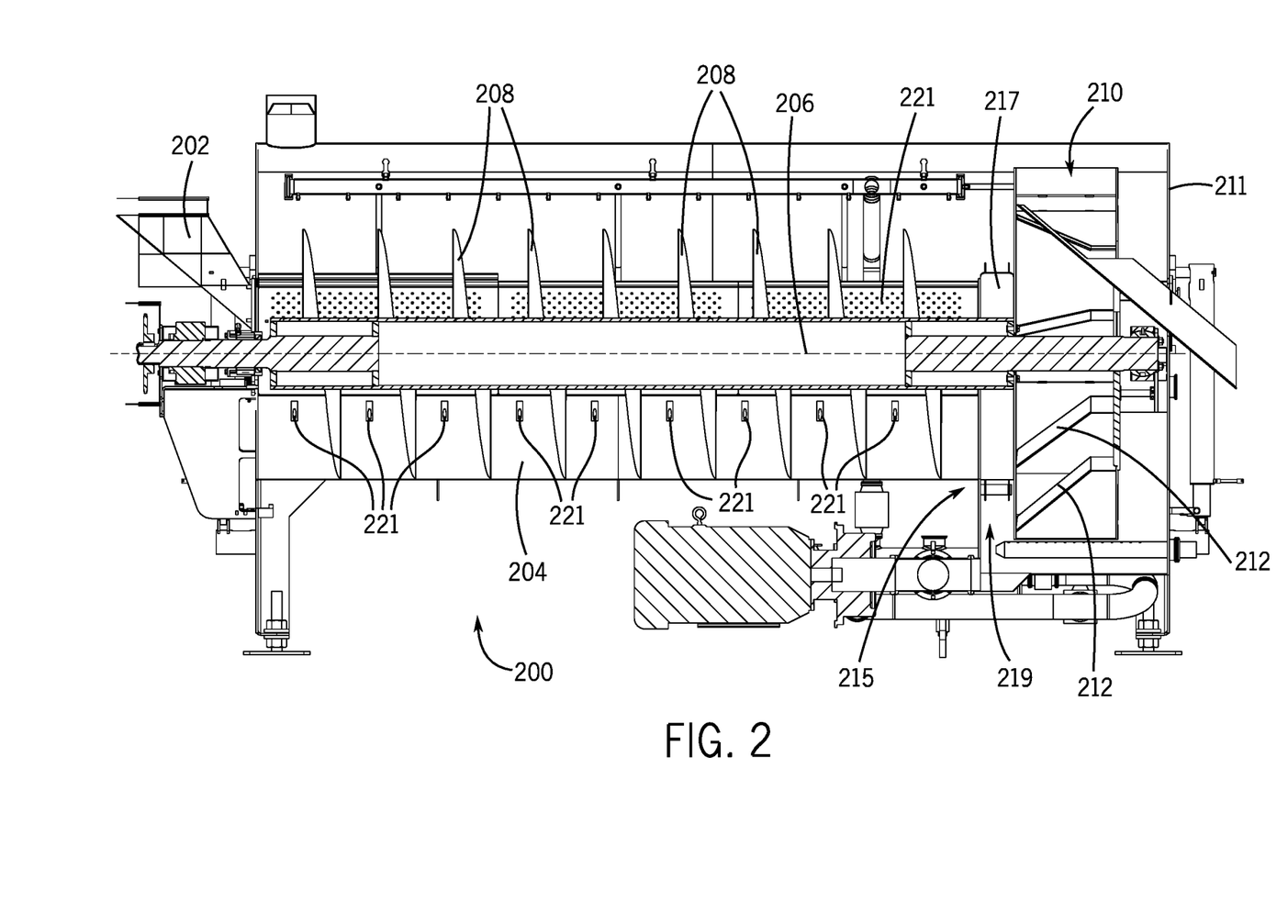
FIG. 2 is a cross sectional view of a blancher in accordance with the present invention.

Turning now to FIG. 2, a cross section of a blancher 200 constructed in accordance with the preferred embodiment is shown. This particular embodiment does not include a intermediate wall, and uses a ferris wheel discharge. Blancher 200 includes an inlet 202, a compartment 204, an auger 206 within compartment 204 and having radial flights 208, and an dewatering section or outlet end 210, near end wall 211. Outlet end 210 includes a ferris wheel discharge 212. Discharge 212 could be another type of discharge, such as a plenum discharge.

A transition area 215 is disposed between compartment 204 and outlet end 210. It may be seen that in this embodiment the diameter of compartment 204 is less than the diameter of outlet end 210, and a transition 217 spans the transition area 215. As explained below the transition is moveable. As shown in FIG. 2, the moveable transition adaptor 217 does not extend beyond the beginning of ferris wheel discharge 212 (the discharge mechanism). Transition 217 prevents food product from collecting in area 219 because transition 217 effectively extends compartment 204 into outlet end 210.

Figure 3:
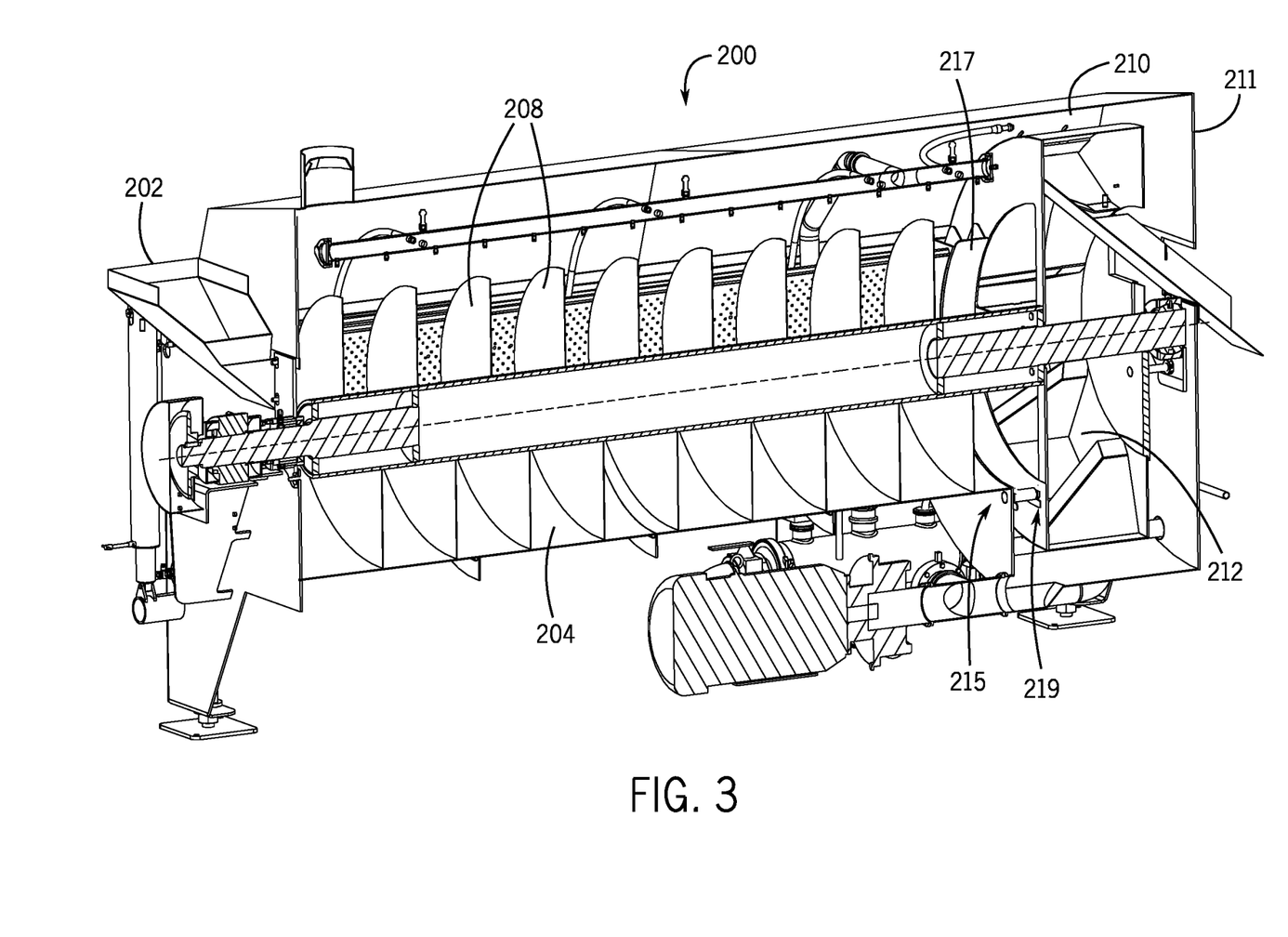
FIG. 3 is a perspective cross sectional view of a blancher in accordance with the present invention.

The perspective view of FIG. 3 shows transition 217 extends from the bottom (6:00 position) upward about 120 degrees (10:00 position). Alternatives provide for the transition to extend 90 or 150 degrees, or from below the fluid water to above the fluid level. There are preferably two transitions 217, the other being a mirror image of that shown. The transition is moveable, from the position shown to a cleaning position, and is preferably an arcuate stainless steel metal transition all that moves between an the position shown where the lower ends are close or abutting, and a cleaning position where the upper ends are close or abutting. The in-use position provides that the transitions form a transition zone within which food product continues to move toward the discharge without dropping into area 219, effectively forming an extension of compartment 204. The position of moveable transition adaptor 217 is shown in FIG. 2 is an operating position for maintaining the food product in a desired product transfer area because the food cannot drop into area 219. Transition 217 preferably extends upward about as far as moveable metal screens 221 extend.

When transition 217 is moved into the clean position, the area 219 is accessible for cleaning.

Figure 4:
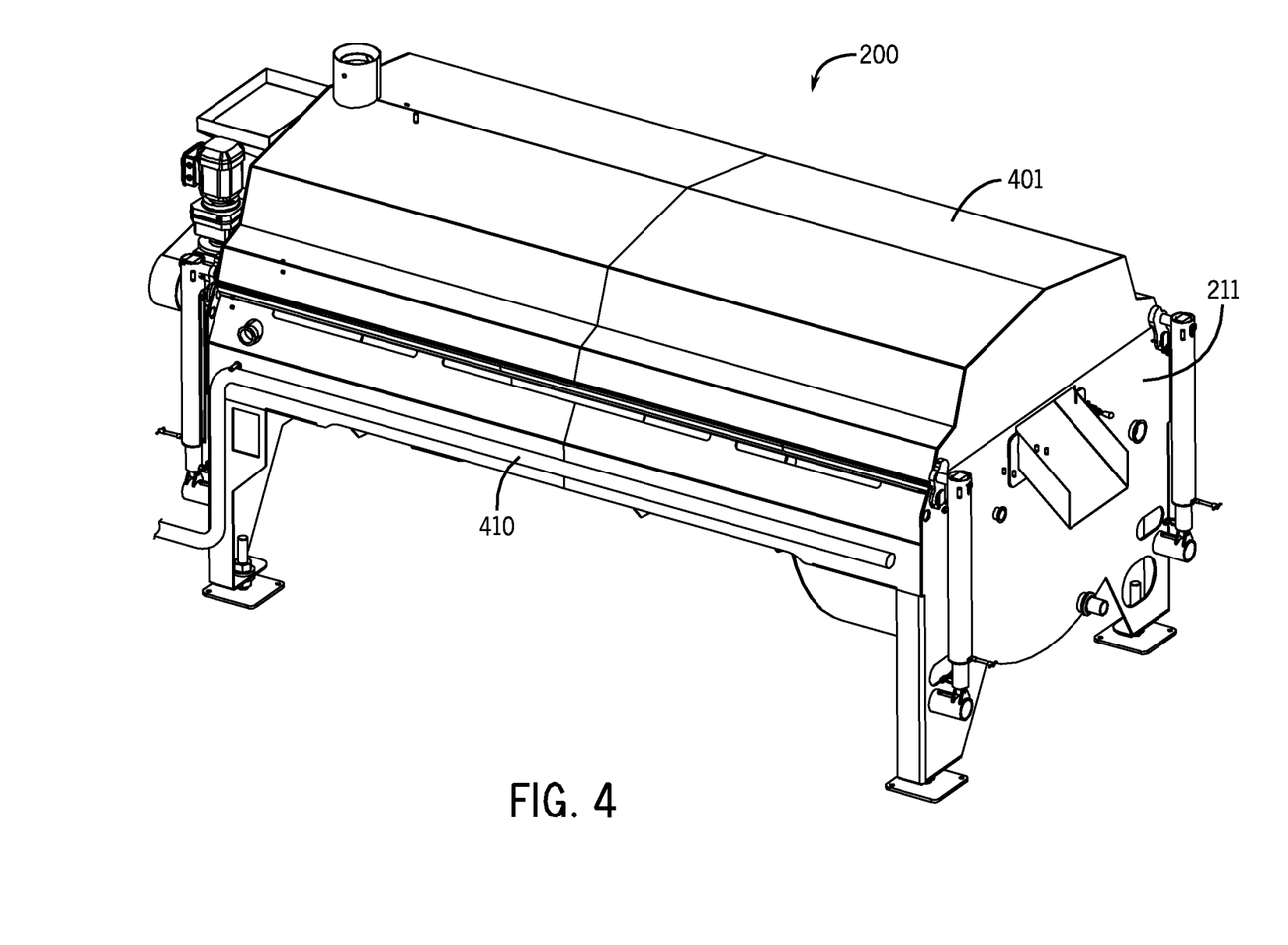
FIG. 4 is a perspective view of a blancher in accordance with the present invention with a cover.

A perspective view of blancher 200 with a cover 401 in the closed position is shown in FIG. 4. Manifold 410 is mounted to the blancher and supplies water to the nozzles.

Figure 5:
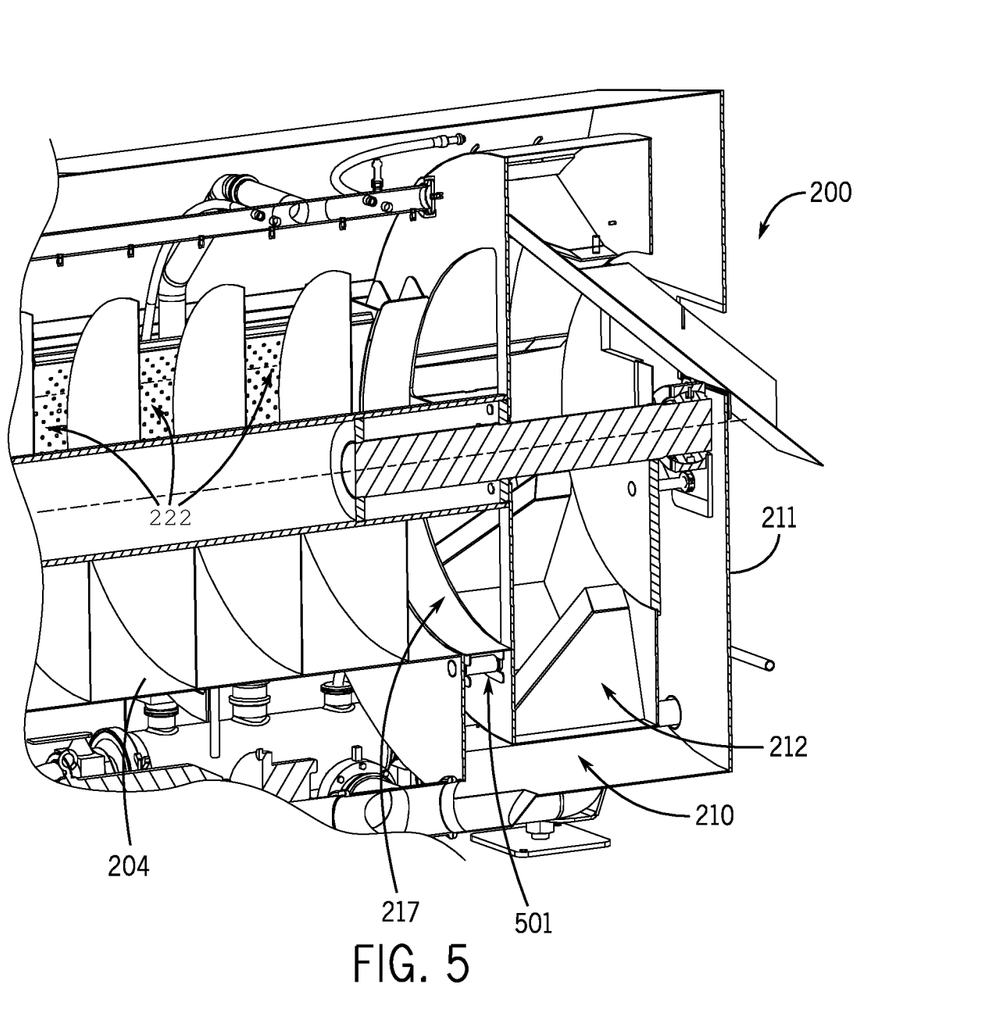
FIG. 5 is diagram of the transition area of a blancher in accordance with the preferred embodiment.

Turning now to FIG. 5, transition 217 extends from a support-index bar 501 for about 120 degrees. Support-index bar 501 hold transition 217 (and its mirror image corresponding transition, collectively called a transition pair) in the proper position, and, if needed, can complete any gap between the transition pair. Support 501 can include slots for each transition 217, or otherwise lock transitions 217 into place. They are moveable when unlocked, as the screen are moveable, to the cleaning position (preferably abutting at the 12:00 position), and are similarly held in position at that location, or are held by a brake, clamp or other restraint. The lock and or brake/restraint are omitted in alternative embodiments. Transitions 217 may be mounted to move with screens 222, or can include a separate mechanism such as a track for moving. Preferably the mechanism causes transitions 217 to move in an arc shape path forming the circumference of a circle.

Figure 6:
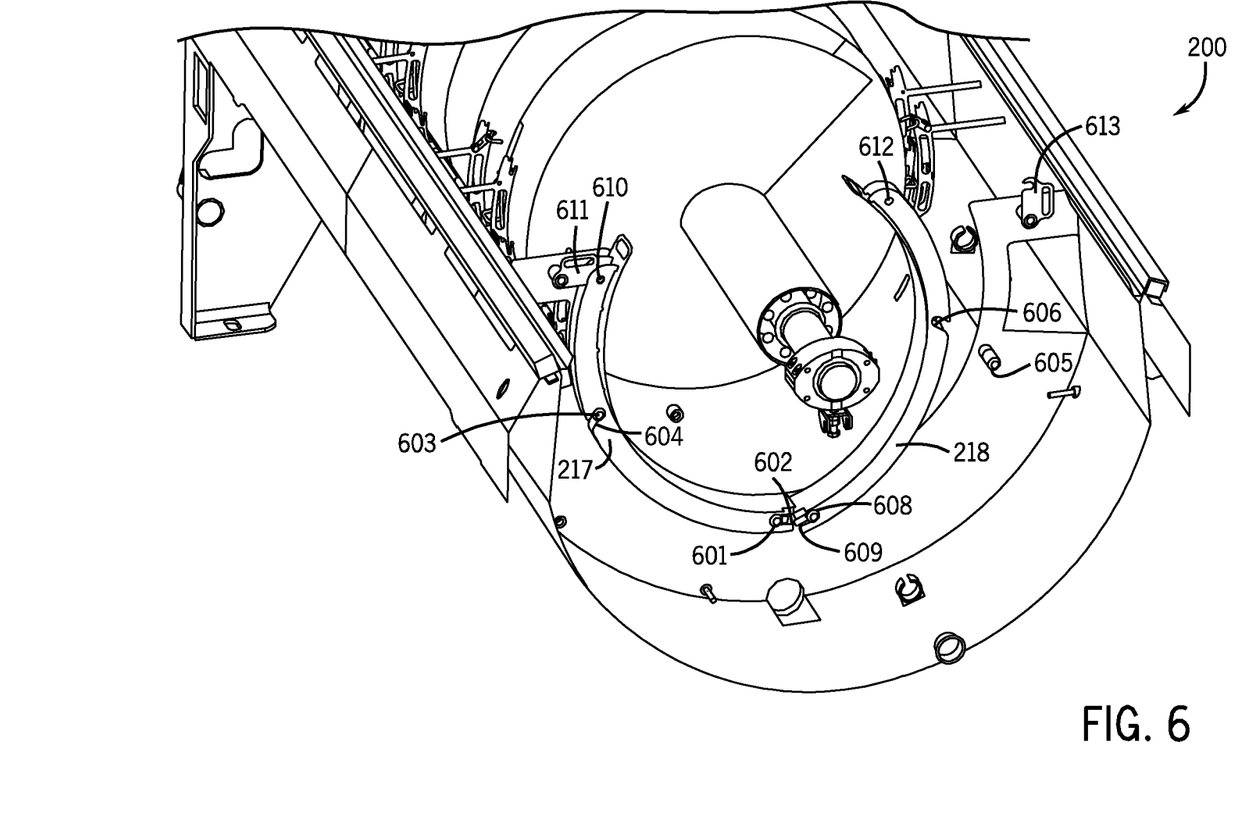
FIG. 6 is a diagram of the transition area showing a clamping mechanism in accordance with the preferred embodiment.

The embodiment shown in FIG. 6 provides that transition 217 and transition 218 are pivotable and removable rather than rotating to a new position on a track. Here, the cleaning position can be entirely removed, or left in the tank for cleaning FIG. 6 shows transition 217 in the operating position, and transition 218 partially in the operating position. Transition 217 includes slots 602 and 604, and pin 610. Pins 601 and 603, and a moveable hook 611 are affixed to blancher 200. Slot 602 receives pin 601, slot 604 receives pin 603 and hook 611 is lowered over pin 610, holding transition 217 in place. A clamp can hold hook 611 in the engaged position. Pins 601, 603, 610, hook 611 and slots 602 and 604 are collectively referred to as a clamping mechanism, because they cooperate to clamp transition 217 in place. A portion of the clamping mechanism is affixed to blancher 200 and a portion of the clamping mechanism is affixed to transition 217.

Transition 218 is identical to transition 217, with slots 609 and 606, and pin 612. A pin 608, affixed to blancher 200, is beginning to be received by slot 609. A pin 605, on blancher 200, will be received by slot 606 when transition 218 is fully in the operating position. Pin 612 will be engaged by a hook 613, attached to blancher 200, when transition 218 is fully in the operating position, and when hook 613 is rotated downward. A clamp can hold hook 613 in the engaged position. Pins 608, 605, 612, hook 613 and slots 609 and 606 are also a clamping mechanism, because they cooperate to clamp transition 218 in place.

Numerous modifications may be made to the present invention which still fall within the intended scope hereof. Thus, it should be apparent that there has been provided in accordance with the present invention a rotary screw blancher that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A food processing apparatus comprising:
   a tank having an inlet end for receiving food product and an outlet end for discharging the food product, the tank having an inner wall defining a compartment and including a solid, imperforate wall portion, and fluid being contained in the compartment;
   a rotatable auger mounted in the compartment along a longitudinal axis of the compartment, the rotatable auger for advancing the food product within the compartment from the inlet end toward the outlet end, the rotatable auger including flights having a flight wall on a rotational shaft of the rotatable auger with a radial edge on the flight wall, the flight wall separating a first auger section from a second auger section;
   wherein the outlet end includes a discharge mechanism, and further includes a moveable transition adaptor that extends toward the outlet end from the rotatable auger in the direction the food product advances, and wherein the moveable transition adaptor does not extend beyond the beginning of the discharge mechanism, and wherein the moveable transition adaptor has a first operating position for maintaining the food product in a desired product transfer area and a second cleaning position to allow access to a cleaning area, wherein the moveable transition adaptor is held in the first operating position by a clamping mechanism partially affixed to the moveable transition adaptor.

2. The food processing apparatus of claim 1, wherein at least one of the inner wall and the flights are at least partially perforated whereby the fluid can flow between the flights.

3. The food processing apparatus of claim 2, wherein the inner wall includes a first moveable portion having a compartment operating position for maintaining the food product in the compartment and compartment cleaning position to allow access for cleaning the compartment.

4. The food processing apparatus of claim 1, wherein the discharge mechanism further comprises at least one of a discharge chute, a plenum discharge, and a ferris wheel, disposed to receive the food product from the moveable transition adaptor.

5. The food processing apparatus of claim 1, further comprising a source of heated water disposed to provide heated water to the compartment.

6. The food processing apparatus of claim 5, further comprising a cooler disposed to receive the food product from the moveable transition adaptor.

7. The food processing apparatus of claim 1, further comprising a source of chilled water disposed to provide chilled water to the compartment.

8. The food processing apparatus of claim 1, wherein the inlet end includes at least one of a chute and a flume extending into the compartment.

9. The food processing apparatus of claim 1, further comprising a moveable cover attached to the tank.

10. The food processing apparatus of claim 1, further comprising a manifold disposed to provide water to the compartment.

11. The food processing apparatus of claim 10, wherein the manifold is disposed outside of the tank, and nozzles connected to the manifold inject the water into the compartment.

12. The food processing apparatus of claim 10, wherein the manifold is disposed inside of the tank, and nozzles connected to the manifold inject the water into the compartment.

13. The food processing apparatus of claim 1, wherein the moveable transition adaptor covers an arc of at least 240 degrees.

14. The food processing apparatus of claim 1, wherein the moveable transition adaptor covers an arc of at least 180 degrees.

15. The food processing apparatus of claim 1, wherein the fluid is disposed in the tank, and the moveable transition adaptor extends from beneath a fluid level to above the fluid level.

16. The food processing apparatus of claim 1, wherein the moveable transition adaptor is comprised of two portions, and a support bar that support each of the two portions when the moveable transition adaptor is in the first operating position.

17. The food processing apparatus of claim 15, wherein the two portions are each a mirror image of the other.

18. The food processing apparatus of claim 1, wherein the moveable transition adaptor forms a portion of a circumference of a circle, and wherein when the moveable transition adaptor is moved from the first operating position to the second cleaning position it follows a path that further defines the circumference of the circle.

19. The food processing apparatus of claim 1, further comprising a restraint that engages the moveable transition adaptor to hold the moveable transition adaptor in the second cleaning position.

20. The food processing apparatus of claim 1, further comprising a clamping mechanism, partially affixed to the moveable transition adaptor.

21. The food processing apparatus of claim 1, wherein the second cleaning position is a fixed position attached to the tank.

22. The food processing apparatus of claim 1, wherein the second cleaning position is outside of the tank.

* * * * *

UNITED STATES PATENT AND TRADEMARK OFFICE
CERTIFICATE OF CORRECTION

| | | |
|---|---|---|
| PATENT NO. | : 11,064,724 B2 | Page 1 of 1 |
| APPLICATION NO. | : 16/146119 | |
| DATED | : July 20, 2021 | |
| INVENTOR(S) | : Daniel D. Maupin | |

It is certified that error appears in the above-identified patent and that said Letters Patent is hereby corrected as shown below:

On the Title Page

Item (73) In the Assignee:
Delete "Illinois Tool Works Inc, Glenview IL (US)"
And Insert -- Lyco Manufacturing, Inc., Columbus WI (US) --

Signed and Sealed this
Third Day of September, 2024

Katherine Kelly Vidal
*Director of the United States Patent and Trademark Office*